United States Patent
Posa et al.

(10) Patent No.: US 6,526,219 B1
(45) Date of Patent: Feb. 25, 2003

(54) PICTURE-BASED VIDEO INDEXING SYSTEM

(76) Inventors: John G. Posa, 1204 Harbrooke, Ann Arbor, MI (US) 48103; Barry H. Schwab, 5298 Cedarhurst, West Bloomfield, MI (US) 48322

(*) Notice: Subject to any disclaimer, the term of this patent is extended or adjusted under 35 U.S.C. 154(b) by 1243 days.

(21) Appl. No.: 08/556,746

(22) Filed: Nov. 2, 1995

(51) Int. Cl.[7] .............................. H04N 5/91; H04N 7/00
(52) U.S. Cl. .............................. 386/68; 386/69; 386/46
(58) Field of Search ........................... 386/1, 4, 33, 46, 386/52, 96, 109, 125, 126, 55, 68, 69, 107, 117, 120, 6; 360/32, 33; 348/384; H04N 5/91, 7/00

(56) References Cited

U.S. PATENT DOCUMENTS

| | | | |
|---|---|---|---|
| 4,224,644 A | | 9/1980 | Lewis et al. ................ 360/72.2 |
| 4,338,644 A | | 7/1982 | Staar ........................... 360/132 |
| 4,422,105 A | | 12/1983 | Rodesch et al. ............ 358/903 |
| 5,126,851 A | * | 6/1992 | Yoshimura et al. .......... 358/335 |
| 5,142,302 A | * | 8/1992 | Kano ...................... 346/76 PH |
| 5,148,764 A | | 9/1992 | Berkenheger et al. ...... 116/318 |
| 5,233,485 A | | 8/1993 | Yang ........................ 360/72.1 |
| 5,282,049 A | * | 1/1994 | Hatakenaka et al. ........ 358/335 |
| 5,287,230 A | | 2/1994 | Kamide et al. ............... 360/60 |
| 5,321,396 A | | 6/1994 | Lamming et al. ....... 340/825.49 |
| 5,353,121 A | | 10/1994 | Young et al. ................ 348/563 |
| 5,362,348 A | | 11/1994 | Gutherie ...................... 156/233 |
| 5,390,027 A | * | 2/1995 | Henmi et al. ................ 358/335 |
| 5,457,675 A | * | 10/1995 | Suzuki et al. ................. 386/69 |
| 5,459,582 A | | 10/1995 | Takahashi ................... 358/335 |
| 5,541,738 A | * | 7/1996 | Mankovitz .................... 386/83 |

\* cited by examiner

*Primary Examiner*—Robert Chevalier
(74) *Attorney, Agent, or Firm*—Gifford, Krass, Groh, Sprinkle, Anderson & Citkowski, PC (57) ABSTRACT

A video indexing system uses pictures representative of a recorded video program to assist a user in determining the contents of a recorded medium without having to view the program itself. The pictures preferably represent segments of the program which are spaced apart in time, enabling a relatively small number of such pictures to characterize a lengthy program, and are presented in separate windows on the screen of the same device used to display the video program. The pictures may include still or moving imagery. A viewer optionally may select a particular picture with a pointing device, to commence replay of the recorded program from that period in the program, or to recall stored audio information so as to assist in identifying the selection. The picture information may be stored on the same medium as that used to record the video program, or a different medium may be used.

23 Claims, 2 Drawing Sheets

PICTURE-BASED VIDEO INDEXING SYSTEM

FIELD OF THE INVENTION

The present invention relates generally to video recording, and, more particularly, to a system for storing and displaying "thumbnail" images representative of the contents of a video recording medium, thereby enabling a user to locate a particular section rapidly and conveniently.

BACKGROUND OF THE INVENTION

As the popularity of video cassette recorders (VCRs) has spread, many users have amassed extensive libraries of recordings, representing a wide range of program materials collected over an extended period of time. In most cases, users are faced with the alternative of either maintaining detailed records as to the contents of individual tapes, or sorting through an entire collection until a desired tape is found. Since the rigorous cataloging of tapes has little appeal to users, most users simply resort to notes affixed to individual cassettes, or they write descriptive information on a tape label. However, once the number of tapes in a library exceeds ten or fifteen units, this method for marking becomes unmanageable. Moreover, in the future, new, more compact, video recording media, such as smaller cassettes, magnetic disks, and recordable optical discs or "videodiscs," are likely to make such marking methods increasingly impractical.

SUMMARY OF THE INVENTION

In contrast to existing video indexing arrangements which are text-based, this invention uses pictures representative of a recorded video program to assist a user in determining the contents of a recorded medium. The use of pictures enables the index to be generated automatically from the recorded program material itself, thereby minimizing or eliminating the need to enter textual or other identifying information. Not only is suitable picture information already available in the program material being recorded, but it also is clear that even a small number of pictures may convey significant detail about the contents of a particular program.

Broadly, given a video program to be recorded, a method of indexing that program in, accordance with the invention, includes the steps of separately storing picture-based information representative of the program and later displaying the picture information without having to view the program itself. An index according to the invention may be generated after as well as during the recording process. Considering a video program as a sequential set of images, the invention prescribes separately storing information representative of a small subset of the images and displaying images from this subset as a method of identifying the contents of the video program. Preferably, the pictures represent periods of the program which are separated in time, enabling a relatively few such pictures to characterize an otherwise lengthy program. By way of example, 12 pictures, each representing segments in the program which are spaced apart in time by 10 minutes, may be used to identify and/or index a 2-hour movie. The same display device used for viewing the program material may be used to display the pictures, which preferably are presented in separate windows on the screen. In alternative embodiments, the pictures may include still or moving imagery and, as a further option, the viewer may select a particular picture to commence replay of the recorded program material associated with the picture selected, or initiate playback of stored audio information associated with the picture selected as part of identifying the chosen program segment.

The picture information may be stored on the same medium as that used to record the video program, or a different medium may alternatively be used. To reduce storage requirements, the information is preferably data compressed then de-compressed for display purposes. To derive the information used to generate the pictures, the video program may be sampled on a periodic basis or distributed and received with integrated encoded picture information, which then may be stored separately.

To ensure that the pictures themselves adequately represent the recorded program, aspects of the program may be analyzed prior to the extraction of the picture information to ensure that blank segments, commercials, or other unwanted information is not stored inadvertently, instead of pictures representative of program subject matter. As a further aid to the characterization of a recorded program, the system may automatically store pictures associated with the beginning and/or ending of a particular program or recording session.

In terms of apparatus, the invention may either incorporate a video recorder and a display device, or alternatively, use existing equipment, such as a VCR or disc drive, for recording purposes. A television monitor, computer screen or any other suitable display device may be used for viewing. In conjunction with such hardware, the inventive system includes an input for receiving a video program to be recorded by the video recorder, means for deriving and storing pictures representative of time-separated segments of the program, and means for formatting the stored pictures for viewing on the display device. In a comprehensive embodiment, the hardware includes a picture memory (such as a battery-backed-up random-access memory) for storing the images associated with each of the time-separated segments of the program, a frame buffer in communication with the picture memory and display device, and video display generation means for outputting the contents of the frame buffer to the display device in the form of a video signal.

To convey motion in different windows on the display device, the picture memory stores not one but a series of images associated with each of the time-separated segments of the program, and further includes means for periodically updating the frame buffer with individual images from a particular group, so as to convey motion. In this embodiment which supports moving pictures in multiple windows, a multi-channel tuner may be added and sequenced so that pictures representative of the video programs available on each of the tuned channels will appear in the separate windows, rather than indexing information.

DETAILED DESCRIPTION OF THE PREFERRED EMBODIMENT

Broadly, this invention automatically generates a display of pictures representative of program material stored on a video recording medium. Although the term "video" is used throughout this specification, it should be recognized as including all forms of electronically recorded imagery, whether or not compliant with a standardized format, including existing video formats such as NTSC, PAL, SMPTE Standard 240M HDTV, and so on. Operationally, then, given a recording medium capable of storing video information, whether in the form of a tape or disc, whether magnetic, optical, etc., the user accesses the medium in an appropriate playback system, and, on an associated display device, there appears one or more "thumbnail" or "vignette" images representative of the material recorded on that medium. In the preferred embodiment, a plurality of windows appears on the associated display device, each window including imagery associated with time-separated portions of the recorded program material. For example, the invention may be configured so as to generate an array of windows on the screen (for example, 9, 16, or some other number), each window representing a time-specific portion of the program material, but the contents of each window preferably being separated in time by several minutes, thereby enabling a relatively small number of such windows to represent a more comprehensive amount of recorded program material, even hours worth of such programming. To be more specific, a system according to the invention could generate, for example, 20 windows, each representative of portions of the recorded program material time-separated by, say, 15 minutes, thus enabling the 20 windows to be indicative of 5 hours of recorded program material. As will be described in much greater detail below, the gap in time between each window need not be fixed, but instead may be chosen in accordance with some other parameter, such as the beginning or ending of a recording sequence. As will also be described below, the imagery in each window need not be a still picture, but may include motion, preferably a few seconds of images related to a localized time slice. Although the invention should find immediate applicability in the determination of the contents of an unmarked or inadequately labeled video cassette, (in which case the invention would preferably be incorporated into a video cassette recorder (VCR)), the invention is not limited to this end application, and may be used in conjunction with the identification of electronic imagery in disc form, for example, for use with an appropriate reader interfaced to a personal computer or work station, including multimedia CD-ROMs, and so forth.

Generally speaking, then, when video program material is being recorded in a system equipped with the present invention, information used to generate image windows of the type discussed above is also recorded, preferably on a periodic basis and in digitally compressed form, as further described below. Although the information used to generate the image windows is derived from the program source material, different alternatives are available, according to the invention, for deriving such material and for the storage thereof. For example, an incoming source signal containing program material to be recorded may be sampled on a periodic basis, and these sample images may be digitally compressed and stored for use during playback of the material. However, the information used to generate the window imagery either may be derived directly from the video signal or data stream associated with the program material itself or, alternatively, broadcasters may cooperate by transmitting program material including supplemental information which may be used to generate image windows associated therewith, either in an unused portion of the signal for the program material, such as during a blanking interval, on a separate, unused channel, or by other appropriate means. In terms of storage, the information used to generate the window imagery either may be stored separately from the recording medium used to store the program material itself, or, alternatively, may be stored along with the program material on the same medium, either in predetermined areas or interspersed with the program material. The tradeoffs associated with these various options will become more evident in light of the descriptions which follow. As an alternative to picture-based indexing in progress with the recording of video program material, a fully or partially recorded medium may also be indexed according to the invention on an off-line basis.

Figure 1:
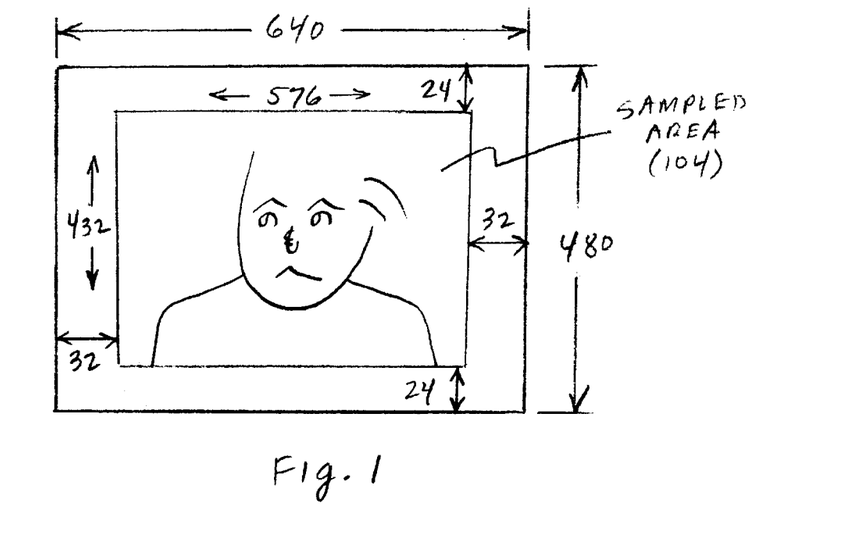
FIG. 1 is a drawing of a picture used to discuss its active area and storage requirements, in accordance with this invention.

Before considering the various alternative implementations, storage requirements first will be discussed in conjunction with applicable compression techniques. In FIG. 1 there is shown a picture having an active area 102 comprising an image area having dimensions of 640×480 pixels, which represents a typical NTSC 2-field frame based on square pixels. One of skill should readily appreciate the applicability of the invention to video standards having different configurations or image dimensions in pixels. In order to reduce storage requirements in conjunction with the invention, since the subject matter contained in the central area of the image most likely will carry the greatest significance, a band around the outer perimeter of the image need not be sampled, resulting in a sampled area 104 of 576×432 pixels. This assumes that 24 pixels on the top and on the bottom of the image and 32 pixels on either side are disregarded, although bands of different widths may be used according to the circumstances. In one alternative, the system may include hardware for "recognizing" appropriate subject matter, in which case the sampled area may form part of a moving window which moves according to actions of the subject matter.

Given a sampled area of 576×432 pixels, if every sixth line is then considered for storage, the result is 72 lines per image, and, if 96 equally spaced apart columns are sampled per line, this results in 6912 total pixels. If three bytes are used per sample, two bytes associated with chrominance information and one byte for encoding luminance information, this results in 20,736 bytes of information, without resorting to any compression techniques. However, utilizing available compression engines such as JPEG, a compression ratio of 16:1 is readily achievable, resulting in 1,296, or approximately 1,300 bytes for a sampled frame. Preferably, to this will be added a number of bytes which may be used for the purposes of identification, including an alpha-numeric label, location tag, time/date stamp, and so forth. As such, an estimate of 1,500 bytes per picture may be more appropriate in practice.

Figure 2:
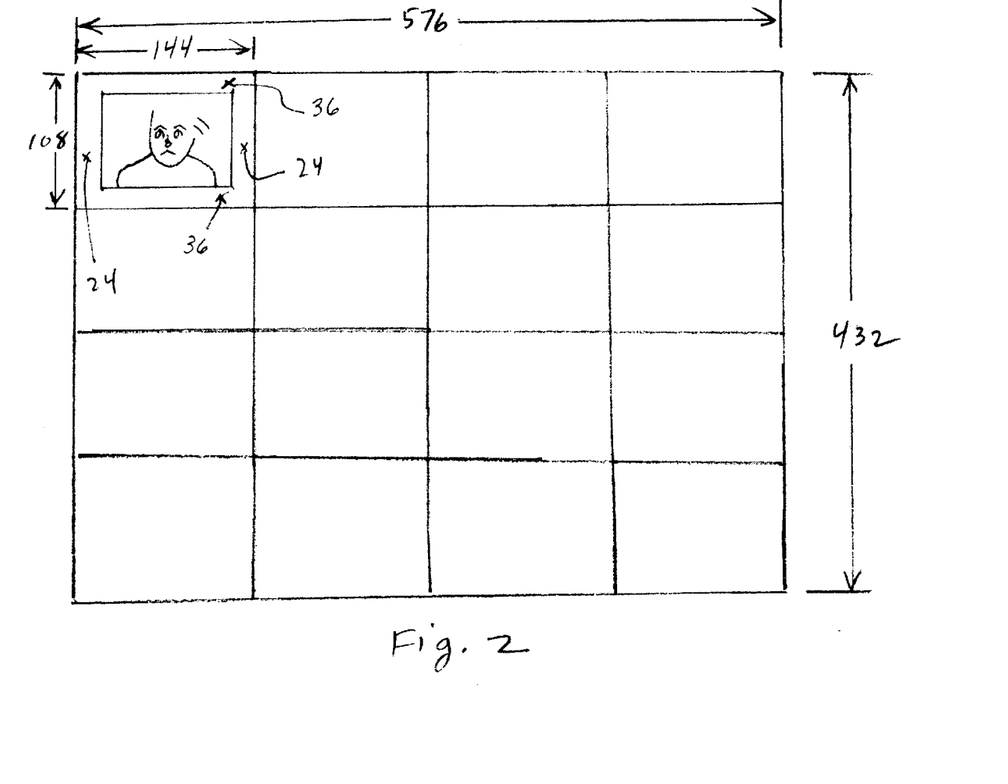
FIG. 2 is a drawing which shows the picture of FIG. 1 in one of a plurality of windows generated by the hardware of the invention.

FIG. 2 illustrates one possibility for a display generated by the hardware to be described, according to this invention. In this example, the picture or frame of video information just discussed with reference to FIG. 1, having previously been stored, is now recalled and displayed in one of many windows so as to facilitate the indexing of the video program. Given a display with a "safe action area" of 432 lines each having 576 pixels (which is, again, a sampling area associated with a typical NTSC frame having square pixels), if each thumbnail image to be shown is allocated a display area of 144×108 pixels, sixteen such images readily may be displayed, each having a framing border and optionally providing space for one or more lines of textual information. Evidently, depending upon the video standard, amount of available resolution, and the number of such vignettes to be displayed, the number of windows may be varied from at least one to more than the number exemplified by FIG. 2, again, depending upon the circumstances.

As mentioned, this picture information either may be stored apart from, or in conjunction with, the same medium used to store the program material as it is being recorded. Assuming that such information is to be recorded on a video cassette along with the program material, various alternatives are available. Particularly, in light of suitable data compression, the picture information may be stored on an on-going, progressive basis, along with the program material, for example, in the vertical retrace interval, although other alternatives are possible, such as the use of other synchronization periods within the video signal, or the control track, particularly for the recording of indexing pointers as discussed below. However, by using the vertical interval, a number of non-visible scan lines may be used to record serial data representative of the pictures, in much the same way that closed-captioning information is recorded. Disregarding horizontal blanking, a scan line represents an available time period of approximately 50 microseconds and, if this serial information is written at a rate of 2 megabits per second, just over 100 bytes will be available if, for example, eight lines of the vertical interval are used for these purposes. Given these 100 bytes per field, if this is carried out over 15 consecutive fields, the requisite 1,500 bytes needed for the storage of a single picture will be available, thereby enabling four pictures to be recorded per second automatically, assuming compliance with an interlaced NTSC standard of sixty fields per second. Thus, assuming sixteen sample pictures are to be displayed for a given length of program material, each sample picture automatically will be recorded in the blanking interval as just described, preferably with a period of several minutes elapsing between the recording of each sample picture.

The vertical interval will be recorded more or less continuously with information associated with all of the pictures in the sequence. As it comes time to record a sample picture, this new picture is added to the existing sequence of information representative of all previously sampled pictures. Thus, when information representative of sixteen pictures has been accumulated, four seconds of vertical retrace intervals will be required for the recording thereof, and, in this particular embodiment, this four seconds of vertical retrace information simply will be rewritten in a continuous cycle every four seconds, since sixteen pictures were previously determined to be the total number associated with that program material. Thus, once these four seconds have been recorded on the tape, during playback and indexing, the system need only recover a total of four seconds worth of tape playback in order to gather all of the information necessary to regenerate all sixteen of the pictures for display. Correspondingly, if indexing is commenced at a point when, for example, only twelve of the pictures of the full capacity of pictures available for display on the screen of the display device, then this system will only need to "back up" for three seconds of tape playback in order to gain the information required to generate and display the twelve sample pictures.

One of the principle advantages of the embodiment just described is that, by using the same recording medium for both the program material and the pictures representative of that program material, separate storage media need not be required for the picture information. However, considering the fact that electronic hardware is required to derive and store the picture information onto the recording medium, it may be advantageous to add separate picture storage capabilities, particularly in light of the operational features to be gained. One potential disadvantage of such separate storage, however, is that, should the medium carrying the program material be carried to a different machine for playback purposes, unless the separate picture storage capability is carried along therewith, the indexing capability according to the invention will not be available during playback on this different machine. However, considering the fact that most consumers use the same system for recording and playback, the use of separate picture storage should not represent a great disadvantage.

One potential problem, however, does exist in the case that a tape that previously has been recorded is re-recorded, with new program material inserted so as to replace one of the existing program. Here, the picture index information in parts of the tape will reflect the contents of the earlier recording, rather than that of the subsequent recording. Although this is likely to be an infrequent occurrence, it does suggest a preference for an embodiment which records the indexing information at a specific location, such as at the beginning of the tape, as this style of embodiment will maintain the accuracy of the indexing information even when re-recording has occurred.

The following embodiments, then, include the use of a separate picture storage capability, preferably in the form of a random-access memory such as dynamic RAM storage or "flash" memory, preferably used in conjunction with a battery back up facility of some kind to ensure that the indexing information is not lost during an interruption of power. As an alternative, a non-volatile type of memory may be used, which may be transferred into a faster, volatile form of memory if retrieval is too slow. The use of a separate memory for storing the picture information may be used with or without storage onto the medium storing the program material itself. For example, information associated with each new picture may be saved separately from the program recording, then, upon activation of a particular operator command (such as END-RECORDING), the information may be transferred from the separate recording memory onto the tape or disc in bulk fashion, in contrast to the accumulating procedure described earlier. For example, at the end of a recording session, one or more subsequent complete video frames (i.e. —utilizing all of the available field lines, and not just the vertical blanking interval) may be used to receive all of the picture information stored during that recording session, then accessed when recording resumes or in conjunction with playback activities. Alternatively, upon the termination of a recording session, the program storage medium automatically may be directed to a particular physical location wherein all of picture information is stored for later retrieval. In the case of a video tape, for example, the tape may be rewound automatically, with the picture indexing information always being stored at the beginning of the tape, so that it conveniently may be accessed when the tape is later inserted into the VCR, thereby enabling the tape to be indexed prior to the next viewing. While this presents certain disadvantages involving the length of time required to rewind the tape after its recording session, such a disadvantage will be minimized dramatically as the industry moves from tape-based recording media to new video discs available from Sony and others, which promise to store many gigabytes of information on an individual disc, and allow availability of this information on a substantially random-access basis. With such media, it should be a much more straightforward procedure to automatically translate the appropriate recording head to a predetermined area of the disc at the conclusion of a recording session, and then record the picture indexing information.

As a further alternative to the use of separate picture storage in conjunction with the storage of program material on a high-capacity medium, such separate memory may be made large enough to accommodate multiple picture images associated with a number of different program storage media, without requiring the transfer of the picture information back onto the program storage media itself. That is, in these alternative embodiments, each program storage medium will be identified in some manner and referenced to the separate picture memory, such that, after the recording has concluded, when accessed for playback the appropriate sections of the separate picture memory will be accessed, and the images associated therewith displayed. For example, in a VCR environment, the system may include several megabytes or gigabytes of hard-disk RAM storage, which at 667 images per MB of storage, could accommodate hundreds or, perhaps thousands of index pictures corresponding to numerous program storage media. In such a case, during the recording process certain supplemental information may be recorded onto the tape along with the program material, such as a tape/disc or program storage medium identification number (recorded on a periodic or continuous basis), and/or frame indexing data, time codes or other pertinent information facilitating more convenient access to particular portions of the program material. For example, in the case of a video cassette, while recording program source material, a unique cassette identification code and/or frame number simultaneously may be recorded onto the tape in a non-visible portion of the signal, such as the vertical blanking interval, or encoded into the control track, as in several indexing techniques well known in the art. At the same time, picture information associated with the program material, either derived from the incoming source program and locally compressed or received in conjunction with the program material through a cooperative broadcaster providing such information, simultaneously would be stored in the separate picture storage medium along with the tape ID code and frame indexing information, if available. Upon playback or through the activation of an INDEX command, under operator direction the stored picture information would be accessed from the separate memory, and formatted for display purposes, preferably in the form of an array of windows, each containing a picture. However, by using a recorded numerical index, time code, or other means for advancing to a particular section of the tape (or disc), an operator may then use a cursor, keyboard or any kind of pointing device to select one of the displayed pictures of the array, which would then cause the program storage medium to advance to the section associated with that picture, to commence replay therefrom, for example, or to begin recording over previously stored program information no longer to be retained.

It should be mentioned, however, that other alternatives according to this embodiment exist for the storage of the picture information or index data to access such information. For example, information may be imprinted on, or encoded within the cassette shell itself, then read by the apparatus of the invention as part of the display of the picture information. In one arrangement according to this embodiment, cassette shells may be provided incorporating semiconductor or other solid-state type of memory, for example, bonded to the inside of the shell, with electrical contacts provided on the outside of the shell for making connection to the IC chip. Upon insertion of the cassette into playback equipment incorporating the invention, the picture information may be stored in the solid-state device and retained there until the next time it is accessed or modified, during subsequent usage. Preferably, any power required for such a memory chip would also be supplied by the playback equipment receiving the cassette, and delivered to the device through the contacts provided externally on the cassette shell. In lieu of a chip or other imprinted means storing the actual picture information, a bar code, for example, may be used to identify that particular cassette and, optionally, to further encode areas associated with a separate memory within the equipment receiving the cassette or other medium, within which separate memory the actual picture information is maintained.

Figure 3:
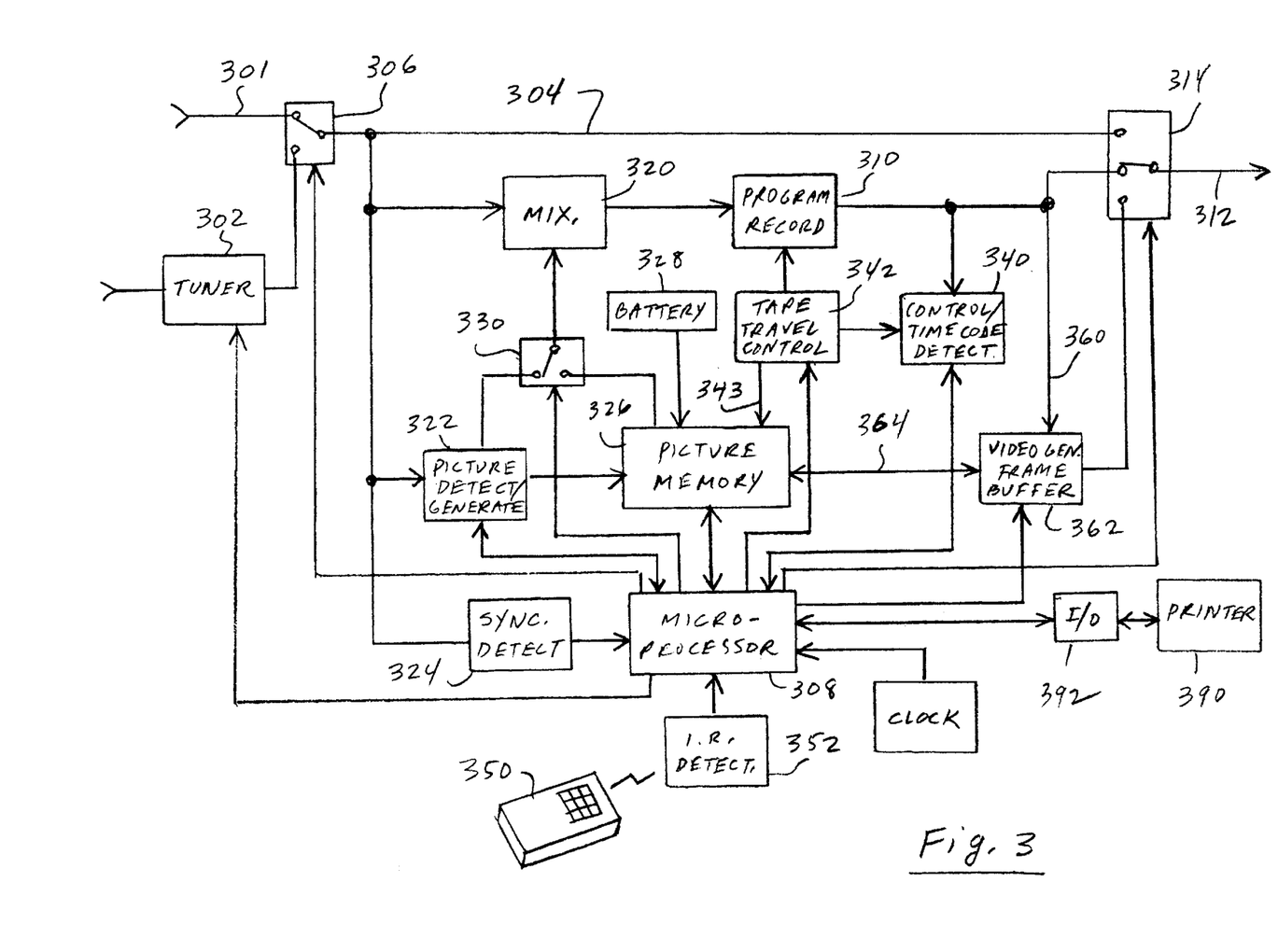
FIG. 3 is a block diagram of the system according to an apparatus aspect of the invention

FIG. 3 illustrates in block diagram form, a hardware embodiment of the invention incorporating separate picture storage means. This figure illustrates a comprehensive version of the invention including features which already may be present in other pieces of equipment, and therefore may not need to be replicated. For example, although, in the preferred embodiment, the same device used to present the video program itself is used for the display of the pictures associated with the indexing thereof, this need not be the case in all embodiments. For example, given a different device, such as a computer, capable of receiving and reading the medium upon which the program material is stored, indexing may be carried out in an entirely separate system, for example, through the use of the computer display. Also, a tuner 302 is shown, in the event that source material is modulated in some form, requiring a conversion to baseband video. However, such a tuner already may be present in an existing VCR or other piece of viewing apparatus. Additionally, the program record block 310 may form part of an existing conventional VCR, in which case other components associated with the invention may be housed in a separate enclosure and attached to the VCR as an add-on unit.

With the understanding that those modules already present in associated equipment need not be duplicated, the system of FIG. 3 operates as follows: an incoming video signal, either directly input along path 301, or converted by tuner 302, is placed onto a signal line 304 using an input video switch 306 which, like most functional blocks in the system, is under the control of a central microprocessor 308. This microprocessor 308 may be of conventional design, and preferably is implemented in the form of a single-chip microcomputer having "on-board" temporary storage and read-only memory (ROM) used to store software program code. The video signal present on path 304 may be switched directly to an output line 312 through output video switch 314, in the event that a user simply wishes to view program source material without recording or indexing of any kind. If the invention is implemented within a VCR, these video switches 306 and 314 already may be present. For that matter, the single chip microcomputer 308 may also be available, and if the unit has sufficient additional inputs, outputs, program memory and performance, also may be utilized for some or all of the functions of the invention which will now be described.

The incoming video signal on path 304 is presented to a mixer 320, a picture detector/generator 322, and, optionally, to a synchronization pulse detector 324 which, in turn, feeds a signal to the microprocessor 308. The sync detector 324 may be unnecessary, in the event that the picture detector/generator 322 extracts sufficient information from the incoming video signal to perform all desired functions. The picture detector/generator block 322 in the preferred embodiment is capable either of detecting compressed picture information provided along with program material by a cooperating broadcaster, or alternatively samples the incoming video signal under microprocessor control and generates the picture information directly from the video signal, in which case block 322 is assumed to include appropriate digitizing and video data compression means. Regardless of the source, the compressed picture information is stored in the separate picture memory means 326 for later retrieval during playback, this picture memory means 326 preferably being supported by back-up power source battery 328.

A video selector switch 330 is used to route information either from the pictured detector/generator block 322 or alternatively from the picture memory means 326, under microprocessor control in accordance with the selected operational mode. For example, if the picture index information is generated locally and intended to be stored together with the recorded program information but without separate picture storage, switch 330 will be used to route the generated picture information directly into the mixer 320, to be recorded simultaneously with the program material, in block 310. Alternatively, if the picture information is recorded onto the program medium as part of a batch transfer process, switch 330 may be used to form a path between picture memory means 326 and the mixer 320, so as to effect the transfer of a group of pictures to the recording medium, again under microprocessor control. To ensure that the picture information is properly recorded onto the program medium, the synchronization detector 324 may be used for such a purpose. In the event that the picture information is stored only in picture memory means 326 and not as part of the program material on the recording medium, the picture memory means 326 preferably also will record an identification code for the medium and, optionally, frame identification information or time-code data used as indexing pointers to the picture stored in conjunction with a particular recording session since it will be advantageous: to record at least such auxiliary information into the record medium during storage of the program material, switch 330 will route such information on a selective basis from a picture memory means 326 through mixer 320 for inclusion in the recorded video signal. Particularly, in the event that some form of time-code is used for this purpose, a separate block 342 labeled "tape travel control" may be used to keep track of the sequencing of the main recording medium (whether tape or disk), feeding a signal to the picture memory means 326 along signal path 343.

Regardless of where the picture indexing information has been stored, upon playback and/or entry of an "INDEX" command via remote control 350 linked to microprocessor 308 through infrared detector 352, the system causes one or more of the stored pictures to be output through signal path 312 in communication with a suitable display device (not shown). As a first step toward displaying this information, the system will determine whether the picture information has been stored on the program medium tape or disk, or instead has been stored separately in the picture memory means 326. Typically this easily will be accommodated by interrogating the program recording medium when it is inserted in the player unit or otherwise activated for access. If it is determined that a different section of the medium needs to be accessed in order to recover this information, the tape travel control block 342 may be utilized for such a purpose. If the system determines that, indeed, picture indexing information has been stored on the recording medium, it will be extracted along path 360 and delivered to a video generator/frame buffer block 362, under control of the microprocessor 308 to be properly formatted for display purposes. In the event that a single array of windows is insufficient to display all of the images associated with the recordings of particular program materials, or is incapable of representing the entire contents of the recording medium, a number of multi-window displays may be used, for example, as "pages", with the microprocessor facilitating such displays in conjunction with picture memory means 326, video generating/frame buffer 362, and inputs from a user via remote control 350. As a further convenience, a printer 390 may be attached through an I/O port 392, enabling an operator to print out the pictures onto paper or a label for affixation to the program record medium or packaging.

If it is determined that the pictures associated with certain program material have been recorded separately in picture memory means 326, the system only may need to interrogate the program recording medium to determine an identification number and thereby locate the associated pictures in memory means 326. Having located a correct set of indexing pictures, these pictures then may be displayed. As discussed above, in the event that frame indexing, time codes, or the like have been used to cross reference recorded program material and the pictures associated therewith, once an array of pictures is provided to an associated display device, touch-screen techniques may be used with appropriate display facilities, or "point-and-shoot" pointing techniques may be used in conjunction with the remote control 350, thereby enabling one of the displayed pictures to be pointed to and selected, following which the tape travel control block 342 will cause the recorded program to advance or rewind to that portion of the tape associated with the picture selected. Again, as utilized herein, "tape" travel control should be construed more broadly to include disks and any other form of recording media.

As an alternative to the storage and display of still pictures associated with the recorded program material, each window instead may include motion imagery representing a few seconds of the recorded material at that particular time. Since it is an object of this invention to enable an operator to more easily and conveniently locate previously recorded material, particularly when stored in an unlabeled or even mislabeled manner, use of motion pictures in each window might further assist a viewer in determining the representative program material. In order to generate such motion imagery, many of the steps just described would continue to be used, however, at the time associated with sampling the source material, not one but a few or numerous frames would be recorded and later displayed in such a manner that each window could communicate a few seconds or more of "action" which would then be repeated, much as the movement of hurricanes and cloud formations is depicted in televised satellite weather forecasts. So as to conserve memory, consecutive frames would not be stored but, instead, a number of frames would be skipped between the updates. Although this might result in uneven motion within a window, it would allow a much greater range of discernability within a particular window for a given storage requirements.

In order to generate such windows with motion, pictures are retrieved from the memory means 326 and delivered to the video generator/frame buffer block 362, in accordance with a predetermined update rate. In order to reduce bandwidth requirements along path 364, each displayed window may be updated on a sequential basis, resulting in the movements in the various windows being "out-of-sync" with one another; however, it will be straightforward for the viewer to interpret the images. That is, for example, the contents of picture memory means 326 may be sampled with respect to the contents of window No. 1, causing motion to appear in that window, while displaying all other windows as they were in the previous frames. Next, the memory means 326 may be sampled and window No. 2 updated, causing relative motion therein to be perceived, while continuing to present the information in all other windows without change, including window No. 1, and so on.

The ability to sample the memory means 326 in order to update windows having motion imagery enables the hardware of the system to perform other advantageous functions not associated with video indexing. For example, the input video source may be sampled in a manner similar to that just described in order to display multiple windows, each with motion imagery, and each representative of a different incoming channel, yet requiring only a single tuner. In this a case, the system operates as follows. Under microprocessor control, the tuner 302 is set to a first channel, and information representative of the image on that channel may be loaded into the frame buffer aspect of functional block 362, appearing in a first window on an associated display device due to the action of the video display generator in block 362. At a short time later, the microprocessor will tune tuner 302 to a second channel, and an image will be extracted therefrom to appear in a second window on the display device, and so on, until multiple windows on the screen simultaneously display images from the various channels so tuned. By continuing the process of channel sampling in a cyclical fashion, each window may then represent not only a still picture of the program being broadcast on each channel, but may be updated in a manner similar to the use of motion images for indexing purposes, as previously described, thereby resulting in multiple windows, each with moving pictures representative of different channels, and all derived through the use of a single tuner. The operator, through controller 350, interface 352, and central microprocessor 308, may select which of the various available channels to display, and may be selected in "touch-screen" or "point-and-click" fashion, as described herein above.

Having described my invention, I claim:

1. A video indexing method, comprising the steps of:
   recording a video program having a sequence of images;
   separately storing information representative of a subset of the images, the image subset representing segments of the program which are separated in time; and
   displaying images from the subset in separate windows on a display device as a way of identifying the contents of the video program, at least one of the windows displaying a segment including motion imagery.

2. The method of claim 1, wherein the information representative automatically the images of the subset is derived through the step of periodically sampling images of video program.

3. The method of claim 1, further including the step of user-selecting a displayed image from the subset to initiate a replay of the recorded program from a point in the program corresponding to the selected image.

4. The method of claim 1, further including the steps of:
   storing audio information in conjunction with an image of the subset;
   user-selecting a displayed image from the subset; and
   replaying the stored audio information corresponding to the selected image.

5. The method of claim 1, further including the step of analyzing the video program to ensure that the separately stored image information contains subject matter from the video program.

6. A picture-based video indexing system configured for use with a video recorder and display device, the system comprising:
   an input for receiving a video program to be recorded by the video recorder;
   means for deriving pictures representative of time-separated segments of the program;
   means for storing the pictures; and
   means for displaying the stored pictures on the display device, including one or more segments containing motion imagery to provide an index of the recorded video program.

7. The picture-based video indexing system of claim 6, including means for sampling the video program on a periodic basis to derive the pictures.

8. The picture-based video indexing system of claim 6, including means for detecting information encoded in the received video program to derive the pictures.

9. The picture-based video indexing system of claim 6, wherein the means for storing the pictures includes means for storing the pictures on the same medium as the recorded video program.

10. The picture-based video indexing system of claim 6, wherein the means for storing the pictures includes means for storing the pictures separately from the recorded video program.

11. The picture-based video indexing system of claim 6, further including means for printing the stored pictures.

12. The picture-based video indexing system of claim 6, wherein the means for displaying the stored pictures on the display device includes means for displaying the pictures in an array of windows.

13. The picture-based video indexing system of claim 6, further including means for storing and replaying audio information to be reproduced in conjunction with the displayed pictures.

14. The picture-based video indexing system of claim 6, further including:
   a picture memory storing information representative of groups of images associated with each time-spaced period of the program;
   a frame buffer in communication with the picture memory and display device;
   video display generation means for outputting the contents of the frame buffer to the display device in the form of a video signal; and
   means for periodically updating the frame buffer with individual images from a particular group to convey motion.

15. The picture-based video indexing system of claim 14, wherein the picture memory, frame buffer, video display generation means, and means for updating are cooperatively operative to display an array of moving pictures on the display device.

16. The picture-based video indexing system of claim 14, further including:
   a multi-channel tuner having a video output in communication with the frame buffer and video display generation means; and
   means for sequencing through a plurality of tuned channels,
   whereby pictures representative of the video programs available on each of the tuned channels appear in separate windows on the display device.

17. The picture-based video indexing system of claim 16, wherein the means for sequencing through a plurality of tuned channels continuously cycles through the channels enabling moving pictures representative of the video programs available on each of the tuned channels to appear in the separate windows.

18. A video indexing method, comprising the steps of:
   receiving a video program having a sequence of images along with separately encoded image information representing segments of the program which are separated in time;
   recording the video program;
   separately storing the encoded image information; and
   displaying images derived from the encoded image information as a way of identifying the contents of the video program.

19. The method of claim 18, wherein the separately encoded information is data compressed and the information is decompressed prior to displaying the images from the subset.

20. The method of claim 19, wherein the data is compressed at least in part by a two-dimensional area of an image to encode the image information.

21. The method of claim 18, wherein the step of displaying images from the subset includes the display of a still image.

22. The method of claim 12, including pictures containing motion imagery.

23. The method of claim 18, wherein the encoded image information includes audio information.

* * * * *

UNITED STATES PATENT AND TRADEMARK OFFICE
CERTIFICATE OF CORRECTION

PATENT NO.    : 6,526,219 B1
DATED         : February 25, 2003
INVENTOR(S)   : Posa et al.

It is certified that error appears in the above-identified patent and that said Letters Patent is hereby corrected as shown below:

Title page,
Item [56], References Cited, insert -- OTHER DOCUMENTS
Hewlett-Packard HP VidJet Pro Catalog --.

Column 2,
Line 61, after "invention" insert -- . --.

Column 11,
Line 40, replace "automatically" with -- of --.
Line 41, after first occurrence of "of" insert -- automatically --.

Signed and Sealed this

Twenty-eighth Day of October, 2003

JAMES E. ROGAN
*Director of the United States Patent and Trademark Office*

(12) EX PARTE REEXAMINATION CERTIFICATE (8527th)
United States Patent
Posa et al.

(10) Number: US 6,526,219 C1
(45) Certificate Issued: Sep. 13, 2011

(54) PICTURE-BASED VIDEO INDEXING SYSTEM

(75) Inventors: John G. Posa, Ann Arbor, MI (US); Barry H. Schwab, West Bloomfield, MI (US)

(73) Assignee: Inmotion Imagery Technologies, LLC, Marshall, TX (US)

Reexamination Request:
No. 90/011,171, Sep. 2, 2010

Reexamination Certificate for:
Patent No.: 6,526,219
Issued: Feb. 25, 2003
Appl. No.: 08/556,746
Filed: Nov. 2, 1995

Certificate of Correction issued Oct. 28, 2003.

(51) Int. Cl.
*G11B 27/11* (2006.01)
*G11B 27/34* (2006.01)
*G11B 27/10* (2006.01)
*G06F 17/30* (2006.01)
*H04N 7/087* (2006.01)
*H04N 7/088* (2006.01)
*H04N 5/76* (2006.01)

(52) U.S. Cl. .................. 386/240; 386/328; 386/E5.001; 348/E7.031; 707/E17.028; 707/E17.029

(58) Field of Classification Search ........................ None
See application file for complete search history.

(56) References Cited

U.S. PATENT DOCUMENTS

| | | | |
|---|---|---|---|
| 5,347,310 A | 9/1994 | Yamada et al. | |
| 5,521,841 A | 5/1996 | Arman et al. | |
| 5,532,830 A | 7/1996 | Schuler | |
| 5,999,173 A | 12/1999 | Ubillos | |

*Primary Examiner* — Ovidio Escalante (57) ABSTRACT

A video indexing system uses pictures representative of a recorded video program to assist a user in determining the contents of a recorded medium without having to view the program itself. The pictures preferably represent segments of the program which are spaced apart in time, enabling a relatively small number of such pictures to characterize a lengthy program, and are presented in separate windows on the screen of the same device used to display the video program. The pictures may include still or moving imagery. A viewer optionally may select a particular picture with a pointing device, to commence replay of the recorded program from that period in the program, or to recall stored audio information so as to assist in identifying the selection. The picture information may be stored on the same medium as that used to record the video program, or a different medium may be used.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 10, 21 and 22 are cancelled.

Claims 1, 6, 7, 9 and 18 are determined to be patentable as amended.

Claims 2-5, 8, 11-17, 19, 20 and 23 dependent on an amended claim, are determined to be patentable.

1. A video indexing method, comprising the steps of:
   recording a video program having a sequence of images;
   separately storing information [representative of] *including* a subset of the images, the image subset representing segments of the program which are separated in time; and
   displaying images from the [subset] *information* in separate windows on a display device as a way of identifying the contents of the video program, at least one of the windows displaying a segment including motion imagery.

6. A picture-based video indexing system configured for use with a video recorder and display device, the system comprising:
   an input for receiving a video program to be recorded by the video recorder;
   means for deriving *information including a subset of* pictures representative of time-separated segments of the program;
   means for storing the *information separately from the recorded video program* pictures; and
   means for displaying [the stored] pictures *from the separately stored information in separate windows* on the display device, [including one or more segments] *at least one of the windows displaying a segment* containing motion imagery *from the pictures in the separately stored information* to provide an index of the recorded video program.

7. The picture-based video indexing system of claim 6, including means for sampling the video program on a periodic basis to derive the [pictures] *information*.

9. The picture-based video indexing system of claim 6, wherein the means for storing the [pictures] *information* includes means for storing the *subset of* pictures on the same medium as the recorded video program.

18. A video indexing method, comprising the steps of:
   receiving a video program having a sequence of images along with separately encoded image information representing segments of the program which are separated in time; recording the video program;
   separately storing the encoded image information; and
   displaying images derived from the *separately stored* encoded image information *in separate windows on a display device* as a way of identifying the contents of the video program, [the] *at least one of the windows displaying* images including motion imagery.

* * * * *